Aug. 2, 1932.   H. SACHS   1,870,205
ELECTROMAGNETIC PICK-UP
Filed July 21, 1931
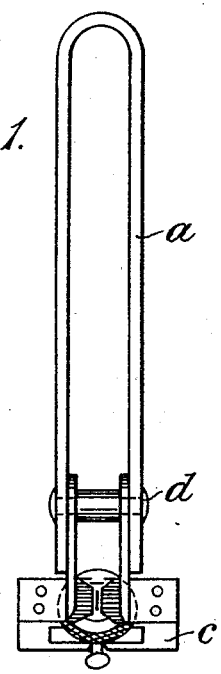
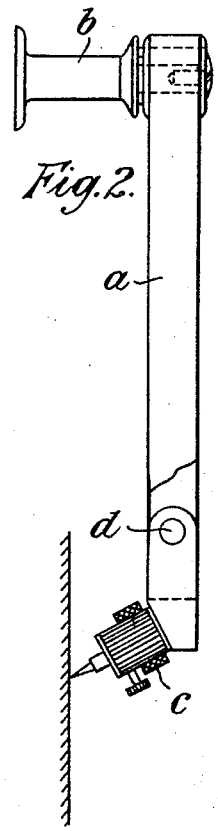
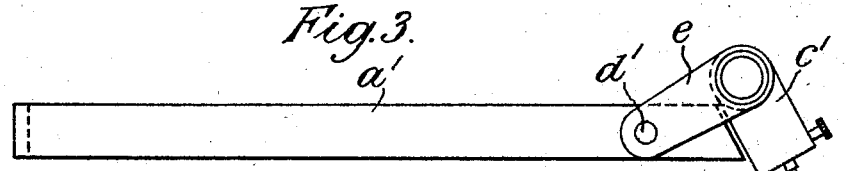
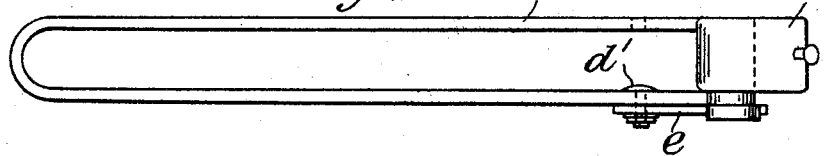
Inventor
Hugo Sachs Patented Aug. 2, 1932

1,870,205

UNITED STATES PATENT OFFICE

HUGO SACHS, OF LEIPZIG, GERMANY

ELECTROMAGNETIC PICK-UP

Application filed July 21, 1931, Serial No. 552,233, and in Germany July 21, 1930.

This invention relates to improvements in electromagnetic pickups and more particularly to carrier arms therefor.

In connection with electrical pickups, it is known that the only practicable way in which satisfactory conversion of mechanical oscillations into electric impulses can be obtained is by the provision of a magnetic field of adequate strength. Since, in the known pickups, the magnet is incorporated in the pickup unit itself, its dimensions are limited, and it is impossible to exceed a certain size, and therefore a definite field strength, since otherwise the unit would become too heavy and counterweights or springs would have to be employed. Although a reduction of pressure on the record can be obtained in this manner, there is no certainty that the pressure of the unit on the record will be perfectly uniform. If springs be employed, they must be compensated, for which purpose special manipulations are necessary, it being extremely difficult to manufacture springs of precisely equal pressure. When weights are used, retardation of the whole weight ensues, without any real advantage being thereby obtained.

The invention aims at obviating these drawbacks by constructing the carrier arm for the pickup as a magnet, mounted so as to overhang and swing above and parallel to the plane of the record, and articulating on the pole branches of said magnet an upwardly tiltable pickup unit which bears on the record, so that the stylus is not loaded by the weight of the magnet.

The powerful magnetic field employed in this case affords a guarantee of accurate frequency transformation and gives a considerably louder tone for a given degree of amplification. The low frequencies in particular are more satisfactorily reproduced by a powerful magnetic field. The magnet serving as the carrier arm for the pickup unit may be made very heavy, and may be overhung, so that the pickup unit alone bears on the record. This unit can now be constructed so as always to be of the same permissible weight, and is adapted to tip up on the magnetic carrier arm. The weight of the pickup unit is no longer dependent on the weight, and therefore size, of the magnet, since in this case, only the unit, consisting of the moving armature, coil and pole shoes, has to be considered, and there is no difficulty in dimensioning these parts accordingly. Pickups of the ordinary pattern may also be attached to the magnet arm, and in this manner the small magnet contained in the pickup is strengthened by the magnet of the arm, without any increase in weight, and a more powerful tone and more accurate reproduction is obtained.

Two typical embodiments of the invention are illustrated in the accompanying drawing in which:

Fig. 1 is a plan of a pickup fitted with magnetic carrier arm.

Fig. 2 is a side elevation; and

Figs. 3 and 4 are a side elevation and plan respectively of a second embodiment.

In the embodiment shown in Figs. 1 and 2, a powerful magnet $a$, forming the carrier arm, is pivotally mounted on the pillar $b$. The pickup unit $c$, consisting only of the moving armature, coil and pole shoes, is adapted to tip up, round the point $d$, at the front end of the magnetic arm $a$, so that it can be turned up in order to replace the stylus.

It will be evident that this arrangement furnishes a more powerful pickup, without damaging the records.

In the embodiment shown in Figs. 3 and 4, an ordinary pickup is attached to an arm according to the invention, the magnetic arm $a'$ being provided with a holder $e$, adapted to tilt at $d'$. The mounting stud of the pickup $c'$ is inserted in a corresponding bore in the lever $e$. Since, when properly attached, the weak magnet embodied in the pickup is strengthened by the magnetic arm $a'$, an inferior pickup of this type can be considerably improved by the employment of this carrier arm.

I claim:—

1. An electromagnetic pickup device comprising a magnet which forms a carrier arm and is mounted so as to overhang and swing parallel to the plane of the record, an upwardly tiltable pickup unit articulated on the pole branches of said magnet and a stylus on said pickup unit making contact with the record.

2. An electromagnetic pickup device comprising a horseshoe magnet which forms a carrier arm and is mounted so as to overhang and swing parallel to the plane of the record, an upwardly tiltable pickup unit pivotally mounted between the open arms of said horseshoe magnet and a stylus on said pickup unit making contact with the record.

3. An electromagnetic pickup device comprising a magnet with an oblique end which forms a carrier arm and is mounted so as to overhang and swing parallel to the plane of the record, an upwardly tiltable arm pivoted near the oblique end of said magnet and a pickup unit mounted on said upwardly tiltable arm and resting against the oblique end of said magnet.

4. An electromagnetic pickup device comprising a horseshoe magnet with oblique ends, which forms a carrier arm and is mounted so as to overhang and swing parallel to the plane of the record, two upwardly tiltable arms pivoted between and near the oblique ends of said magnet and a pickup unit mounted between said upwardly tiltable arms and resting against the oblique ends of said magnet.

In testimony whereof, I affix my signature.

HUGO SACHS.